No. 878,062. PATENTED FEB. 4, 1908.
G. HEINEMAN.
TROLLEY BRUSH.
APPLICATION FILED SEPT. 13, 1907.
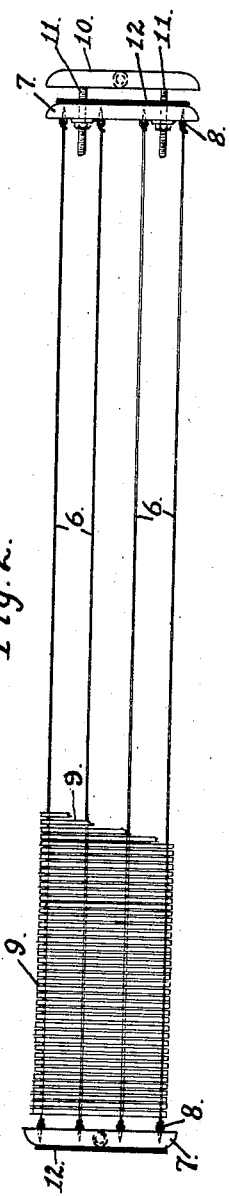
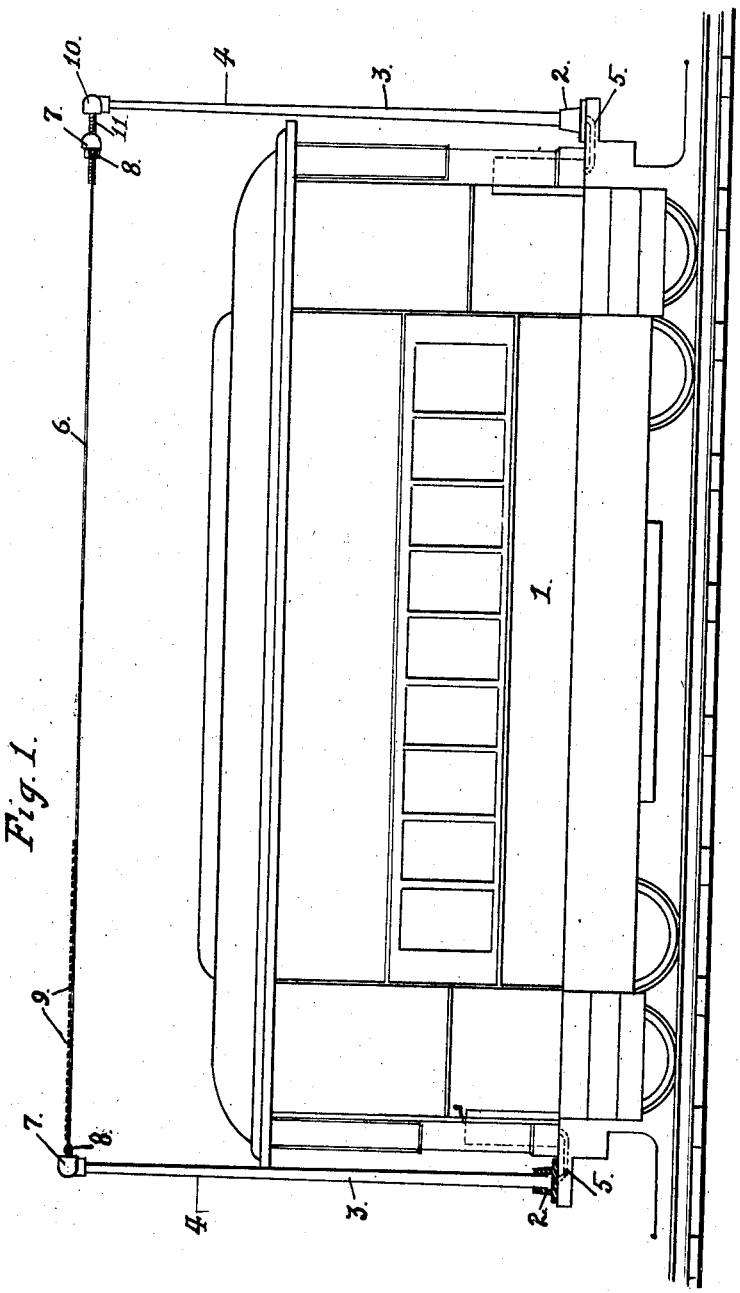
WITNESSES
INVENTOR
Geo. Heineman
BY
ATTORNEY

UNITED STATES PATENT OFFICE.

GEORGE HEINEMAN, OF SAN FRANCISCO, CALIFORNIA.

TROLLEY-BRUSH.

No. 878,062.　　　　Specification of Letters Patent.　　　　Patented Feb. 4, 1908.

Application filed September 13, 1907. Serial No. 392,728.

*To all whom it may concern:*

Be it known that I, GEORGE HEINEMAN, a subject of the Emperor of Germany, residing at the city and county of San Francisco and State of California, have invented certain new and useful Improvements in Trolley-Brushes, of which the following is a specification.

The hereinafter described invention relates to an overhead trolley-brush for use in connection with overhead electric car systems, the object of the invention being to provide a trolley-brush mounted on and extending substantially the length of the car, the said brush being designed to sweep across exposed contact plates arranged above the roadbed and depending at regular intervals from an overhead feed or supply cable for the electric current, the overhead electric car system with which the invention is to be used being set forth in a companion application filed by me of even date herewith.

To comprehend the invention reference should be had to the accompanying sheet of drawings, wherein—

Figure 1 is a side view of an electrically operated car with the trolley-brush applied thereto. Fig. 2 is a plan view of the trolley-brush removed from the car, a portion of the contact field composed of transverse wires, or plates being broken away.

In the drawings, the numeral 1 is used to designate an ordinary electric car, which is provided with the usual motors (not shown).
At each end of the car is secured a socket plate 2, the posts or poles 3 are secured, which said posts or poles are insulated to the point 4. The said posts or poles are secured within the sockets 2 by means of a lead packing, and the said posts or poles extend above the roof of the car 1 for approximately six feet, each post or pole being connected at or near its base to the motors of the car by means of the connection 5.

The trolley-brush, which is arranged above the car as a superstructure, comprises a series of longitudinally disposed wires 6, which are connected at each end to the cross-heads 7 by means of the eye-screws 8, and the said longitudinally disposed wires 6 are connected one to the other by the transverse wires 9, which wires are arranged close together and form a contact field for the trolley brush. These transverse wires are about three or four feet long, so as to provide a field of such width as to insure a portion of its surface bearing against and making contact with the overhead source of electrical supply at all times. Danger of the trolley-brush breaking its connection or what is commonly termed "slipping the trolley" by reason of the oscillation of the car, or while the car is rounding a curve in the line of the trackway being thus avoided, as some one portion of the field of the trolley-brush is at all times in contact with the source of electrical supply for the current.

The longitudinally disposed wires 6 are approximately the length of the car roof, about forty feet, more or less, and one of the cross-heads 7 to which the wires are connected is secured to the arm 10, by means of the coupling bolts 11. The said arm 10, and the cross-head at the opposite end of the trolley-brush is provided with a central opening, which permits of the same being fitted onto the upper noninsulated portion of the poles or posts 3, the same being held thereto in any suitable manner. The outer face of each cross-head 7 is protected by a rubber strip 12.

As the described trolley-brush sweeps across the contacts of an overhead supply or feed cable, an electrical circuit is established, the current passing through the transverse wires 9, which, if so desired may consist of thin metallic plates, to the longitudinally disposed wires 6, and from said wires through the cross-heads 7 to the poles or posts 3, and by the connections 5 to the motors of the car.

Having thus described the invention what is claimed as new and desired to be protected by Letters Patent is—

1. An overhead trolley-brush for electrically operated cars, the same comprising a series of longitudinally disposed wires, and a series of transverse wires arranged in close proximity to each other and connected to the said longitudinally disposed wires, the said transverse wires forming the field of the trolley-brush, the length of the said trolley-brush being substantially the length of the car by which it is to be carried.

2. The combination with an electrically operated car, of a trolley-brush pole secured to each end thereof and extended above the roof of the car, of cross-heads connected to each of the said poles, a series of longitudinally disposed wires secured to the said cross-heads, and a series of transverse wires connected to the longitudinally disposed wires and constituting the field of the trolley-brush.

3. The combination with an electrically operated car, of an insulated trolley brush pole secured to each end of the car and extended above the roof thereof; of connections between the said poles and the motors of the car, of an arm secured to a noninsulated portion of one of the said poles, of a cross-head connected to said arm, a cross-head secured to a noninsulated portion of the opposite trolley brush pole, of a series of longitudinally disposed wires connecting the said cross-heads, and a series of transverse wires connecting the longitudinally disposed wires, the said wires constituting the field of the trolley-brush.

In testimony whereof I have signed my name to this specification in the presence of two subscribing witnesses.

GEORGE HEINEMAN.

Witnesses:
N. A. ACKER,
D. B. RICHARDS.